United States Patent [19]

Thiele

[11] Patent Number: 5,406,877

[45] Date of Patent: Apr. 18, 1995

[54] STEERING/LIFTING APPLIANCE

[76] Inventor: Horst Thiele, Im Kampfrad 2, D-74196 Neuenstadt, Germany

[21] Appl. No.: 162,436

[22] Filed: Dec. 3, 1993

[30] Foreign Application Priority Data

Dec. 3, 1992 [DE] Germany .................. 42 40 686.2

[51] Int. Cl.$^6$ .......................................... F01B 21/00
[52] U.S. Cl. ................................. 92/2; 92/52; 91/61
[58] Field of Search .................. 92/2, 61, 51, 52; 91/61, 167 R

[56] References Cited

U.S. PATENT DOCUMENTS

| | | | |
|---|---|---|---|
| 3,386,340 | 6/1968 | Engle | 92/2 |
| 3,808,953 | 5/1974 | Herbst | 92/2 |
| 3,815,479 | 6/1974 | Thompson | 92/2 |
| 3,973,468 | 8/1976 | Russell, Jr. et al. | 92/2 |
| 5,099,749 | 3/1992 | Darish | 92/2 |

FOREIGN PATENT DOCUMENTS 1253103 12/1960 France .......................... 91/61

OTHER PUBLICATIONS

PHD Multi-Motion Activator pp. 2-3 Dec. 1086.

*Primary Examiner*—Thomas E. Denion
*Attorney, Agent, or Firm*—Darby & Darby

[57] ABSTRACT

A steering/lifting appliance (10) for a hydraulic or pneumatic axle compensation appliance configured as a two-circuit system, having a first external jacket tube (12), a second jacket tube (15) inserted in a pressure-tight manner in the first jacket tube (12) and supported so as to be longitudinally displaceable, a piston device (16) present in a pressure-tight manner in the second jacket tube (15) and supported so as to be longitudinally displaceable, a first closed chamber system to which admission can occur from the outside for controlling the relative displacement between the second jacket tube (15) and the first jacket tube (12) and a second closed chamber system to which admission can occur from the outside for controlling the relative displacement between the piston device (16) and the second jacket tube (15) features a torsion device (40) supported in an end region of the piston device (16) and longitudinally displaceable relative to the piston device (16), which torsion device (40) is in engagement with a second skirt profile (34) of the second jacket tube (15) surrounding the wall of the piston device (16) at least regionally, in such a way that turning of the torsion device (40) effects turning of the second jacket tube (15).

16 Claims, 4 Drawing Sheets

STEERING/LIFTING APPLIANCE

TECHNICAL FIELD

Steering/lifting appliances of this type are employed in transport appliances for the transport of very large and/or very heavy components or installations. In transport appliances of this type, there is usually a plurality of steering/lifting appliances of this type under a loading surface and it is possible to carry out central steering by means of the wheel elements of the steering-/lifting appliances. In many cases, it is simultaneously necessary to ensure interaction with other steering/lifting appliances by means of an axle compensation appliance so as to be able to compensate for unevenness in the ground so that no inclination of the loading surface occurs when passing over the unevenness. An attempt is made to configure the steering/lifting appliance as compactly as possible so that the distance between the loading surface and the surface of the ground is as small as possible.

A known steering/lifting appliance transfers the steering motion by means of a mechanical transmission appliance which has a pivoting drive with king pin and wheel flange to which a knee lever is connected. A drop arm to which the wheel axle is fastened, is connected in turn to the knee lever. Actuation of the pivoting drive pivots the knee lever (which has a relatively flat extension) and therefore also pivots the drop arm, which leads to the wheel being turned. The lifting motion is effected by a hydraulic cylinder extending essentially vertically and connected between the wheel flange with king pin and the knee lever. This complicated design with many individual components is very expensive with respect to assembly. Furthermore, maintenance work has to be carried out at regular intervals, particularly at the connecting points of the components, in order to ensure their function in the long term. A relatively high friction loss occurs during the motion procedure due to the use of the most widely varied mechanical transmission components so that the efficiency of an appliance of this type is not optimum.

A further known steering/lifting appliance has an essentially vertically arranged hydraulic cylinder for lifting and lowering the wheel. Link arms are connected to this hydraulic cylinder and to the axle of the wheel and a second hydraulic cylinder, which is fastened to the loading surface and is arranged in an essentially inclined manner, acts on the link arms so that the longitudinal motion of the piston of the hydraulic cylinder effects the steering of the wheel. Due to the change in position of the lever during the lifting or lowering procedure, differences occur in the steering deflection between a plurality of steering/lifting appliances with wheels because the second hydraulic cylinders are respectively extended or retracted by the same amount but individual wheels take up a different level. This results in increased tyre wear. Because of the pivoting motion of the link arms, the second hydraulic cylinder also executes pivoting motions so that flexible hoses have to be employed to supply the second hydraulic cylinder. In addition to increased assembly requirements and a resulting increase in manufacturing costs, this also implies an increased susceptibility to faults because additional connection points have to be created for the hoses. The design height of a steering/lifting appliance of this type is also relatively large.

A steering/lifting appliance for an axle compensation appliance with the features a), b), c), d) and e) of claim 1 is known from DE 34 38 892 A1. This known axle compensation appliance features the fact that the cylinders combined in one structural unit consist of an intrinsically closed outer chamber, which is filled with oil and to which admission can occur from the outside, and an intrinsically closed inner chamber, which is independent of the previous chamber, is filled with oil and to which admission can occur from the outside; the inner cylinder enclosing the inner chamber can be displaced in a pressure-tight manner in the outer cylinder enclosing the outer chamber; a hollow piston is introduced in a pressure-tight manner into the inner cylinder, into the inner chamber, and can be displaced in it; an oil feeding device furthermore, inserted in a fixed manner in the inner chamber, the length of this oil feed corresponding essentially to the stroke of the hollow piston, and the inner cylinder is displaced so that it slides in a pressure-tight manner on the oil feed. The steering of the wheels takes place mechanically by means of knee levers.

A steering/lifting appliance is known from DE 37 43 203 C2 with the following features:

A first external jacket tube, a second jacket tube inserted in the first jacket tube and supported so as to be longitudinally displaceable, a piston device present in a pressure-tight manner in the second jacket tube and supported so as to be longitudinally displaceable, a first closed chamber system to which admission can occur from the outside for controlling the relative displacement between the second jacket tube and the first jacket tube, a second closed chamber system to which admission can occur from the outside for controlling the relative displacement between the piston device and the second jacket tube, a torsion device, which is supported in an end region of the piston device and which is in engagement with a wall of the second jacket tube, in such a way that turning of the torsion device effects turning of the second jacket tube, at least one drive device which acts at least regionally on the torsion device to turn the torsion device and a cap device fastened to the first jacket tube.

This steering/lifting appliance cannot be employed for a hydraulic or pneumatic compensation appliance configured as a two-circuit system.

DESCRIPTION OF THE INVENTION

The invention is based on the object of providing a steering/lifting appliance which is improved relative to the prior art and which requires a very small installation space, can be manufactured simply and precisely, is practically maintenance-free and ensures a high degree of functionality. In addition, the disadvantages mentioned in the prior art should be avoided. A maximum possible amount of functional reliability should be offered with little complication and, in the process, a maintenance-friendly design should be obtained with little susceptibility to faults. Finally, it should also be possible to employ the steering/lifting appliance for higher travelling speeds, as is the case with the known axle compensation appliance configured as a two-circuit system in accordance with the Deutsche Offenlegungsschrift 34 38 892.

The steering/lifting appliance according to the invention is given by the features of claim 1. Advantageous embodiments and further developments are the subject-matter of the sub-claims.

An extremely small installation space can be effected by the installation of the torsion device in the end region of the piston device. The turning, and therefore the steering of the wheels, can be brought about by a drive device arranged outside the jacket tube. This drive device acts, at least regionally, on the first skirt profile of the torsion device protruding beyond the first jacket tube. The transmission of the steering motion from the torsion device to the piston device takes place by means of the second skirt profile of the second jacket tube. By this means, the parts used for the steering transmission are kept practically free of bending moments. Because there are no steering rods present which change their position during the steering procedure, the appliance can be configured without hoses. The cap device, which is fastened to the jacket tube and which encloses the torsion device and/or drive device, has the effect that all the moving parts float in the hydraulic or pneumatic medium. These parts require no maintenance, particularly when hydraulic oil is used, because no additional connecting points have to be maintained. The wear of these components is also very small. At the same time, the steering/lifting appliance according to the invention represents a low-cost design because no extra bearing structures for the support forces and steering forces, such as are needed in the known steering appliances, have to be configured. The connection between the steering appliance and the support surface takes place directly via the cap device. In addition, exact assembly of the individual components is possible because the piston device is guided in the first and second jacket tube, because the torsion device is guided in the piston device and because the drive device is guided in the cap device.

An advantageous embodiment of the steering/lifting appliance according to the invention has the feature that the piston device has at least a first recess in which a correspondingly shaped first coupling component engages which is connected to the second jacket tube so as to be longitudinally displaceable and which effects the coupling of the turning motion of the second jacket tube and the piston device, and the torsion device has at least one recess in which a correspondingly shaped second coupling component engages which is connected to the second jacket tube so as to be longitudinally displaceable and which effects the coupling of the turning motion of the second jacket tube and the torsion device. The coupling components are preferably configured as spring elements which are guided so as to be longitudinally displaceable in grooves configured on the second jacket tube. The manufacture of the components and the assembly of the components can take place particularly simply with this embodiment. Four spring elements respectively arranged offset by 90° along a circle at right angles to the longitudinal axis of the piston device are preferably present and these spring elements are configured, in a particularly simple embodiment, as cuboidal components.

A particularly favorable embodiment with respect to the small space requirement demanded has the feature that the first skirt profile of the torsion device and/or the second skirt profile of the second jacket tube protruding beyond the first jacket tube is formed by a shaped-on torus. The respective torus preferably has an L-shaped cross-section with a first arm and a second arm, the first arm being arranged essentially parallel in a plane at right angles to the longitudinal axis and the second arm of the first skirt profile being arranged essentially in a cylindrical plane outside the first jacket tube and the second arm of the second skirt profile being arranged between the torsion device and the piston device. This makes it possible to arrange the drive device, which is arranged outside the first jacket tube, essentially below the free end edge of the jacket tube so that a low design height can be achieved. A reliable embodiment with little susceptibility to faults has the feature that the second arm of the first skirt profile is configured as a toothed ring in which at least one drive device, configured as a rack, engages. With respect to freedom from maintenance, a preferred embodiment has the feature that the drive device or rack is supported in the cap device. The first hydraulic or pneumatic chamber system is formed by the outer wall of the torsion device, the inner wall of the cap device, the outer wall of the second jacket tube and the inner wall of the first jacket tube.

The drive of the drive device for steering the steering/lifting appliance can be configured as a hydraulic, pneumatic or mechanical drive. A preferred hydraulic solution has the feature that one closed hydraulic or pneumatic chamber is present at each of the two end regions of the rack, the medium of which chamber being respectively present at the end surface of the rack and a control system being present which controls the displacement motion of the rack by means of the chamber. In this embodiment, all the moving parts float in hydraulic oil so that these parts are practically maintenance-free.

In a preferred embodiment, the piston device is configured as a tubular cross-section in the end region having the torsion device which is longitudinally displaceable. This permits simple assembly of the steering/lifting appliance.

For reasons of pressure relief, the first arm of the first skirt profile of the torsion device is arranged, in a preferred embodiment, externally flush with an outer surface of the torsion device, a support surface arranged at right angles to the longitudinal axis being formed by this means and the support surface of the torsion device facing towards the inside of the cap device having a spiral-shaped groove in which there is, for example, hydraulic oil.

The second chamber system, which is separated from the first chamber system, is essentially formed by the inner wall of the second jacket tube, the outer wall and the inner wall of the piston device. Within an axle compensation system, the first chamber systems and the second chamber systems of the respective steering/lifting appliances are coupled together so that imposed compensation can take place. The provision of a cylinder pair, i.e. the insertion of the second jacket tube in the first jacket tube, achieves the effect that the velocity at the seals is halved for the same lifting velocity at the piston appliance so that the application is brought back to normal values even at a higher velocity. This means that even in the case of a higher travelling speed, the sliding motion, and therefore the friction and the wear, remain at the normal value at the individual seals. The imposed compensation is retained by the coupling to the chamber systems of the other cylinders. At the same time, the wheels can be steered into any position.

Further embodiments and advantages of the invention are provided by the features additionally listed in the claims and by the embodiment example given below.

The features given in the claims can be combined in any way desired insofar as they are not obviously mutually exclusive.

BRIEF DESCRIPTION OF THE DRAWING

The invention and an advantageous embodiment of the same is described and explained in more detail below using the example shown in the drawing. The features which can be taken from the description of the drawing can be applied individually or as a plurality in any given combination. In the drawing.

WAYS OF CARRYING OUT THE INVENTION

Figure 1:
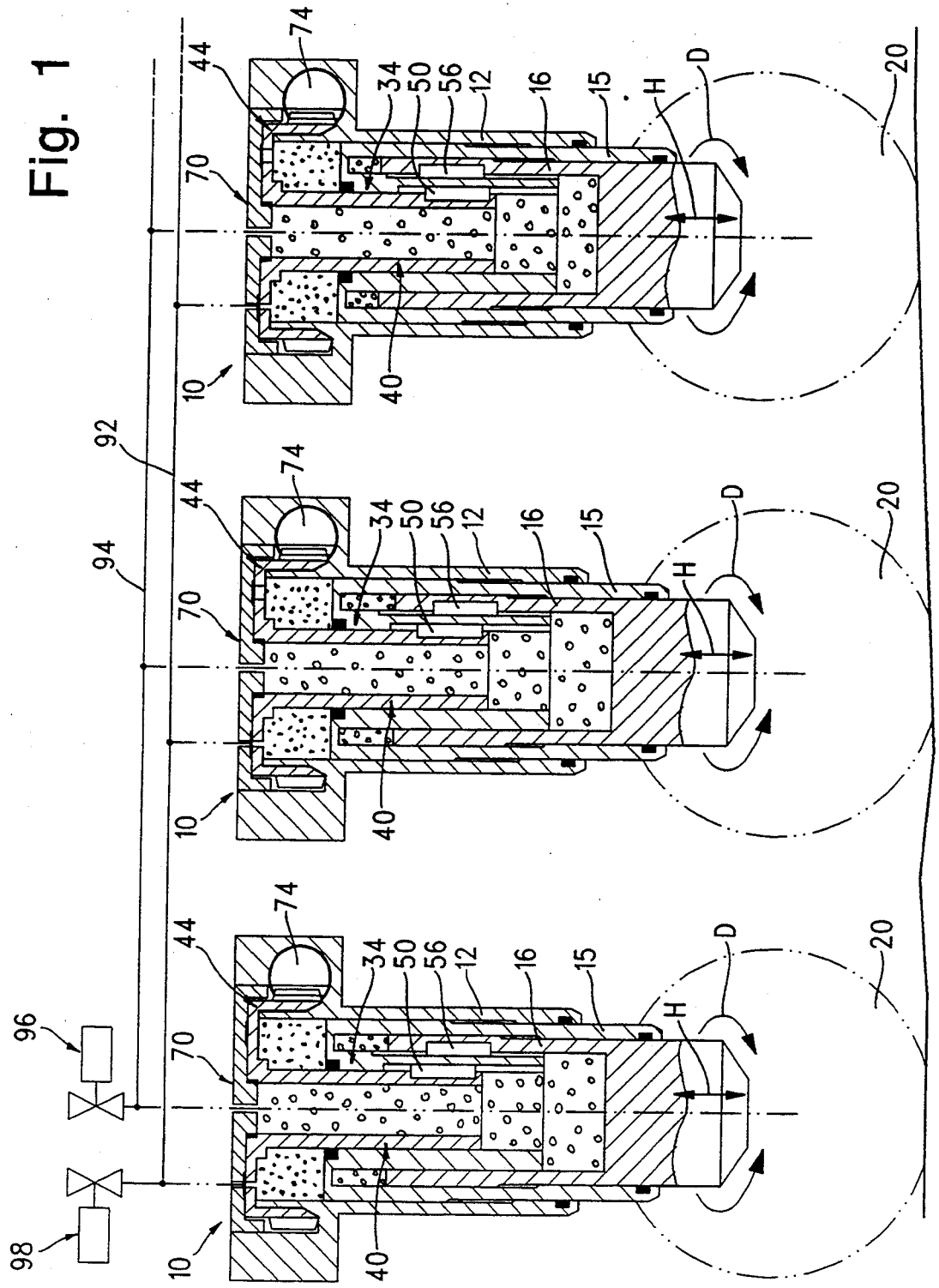
FIG. 1 shows a diagrammatic section through three steering/lifting appliances within an axle compensation appliance configured as a two-circuit system.
Figure 2:
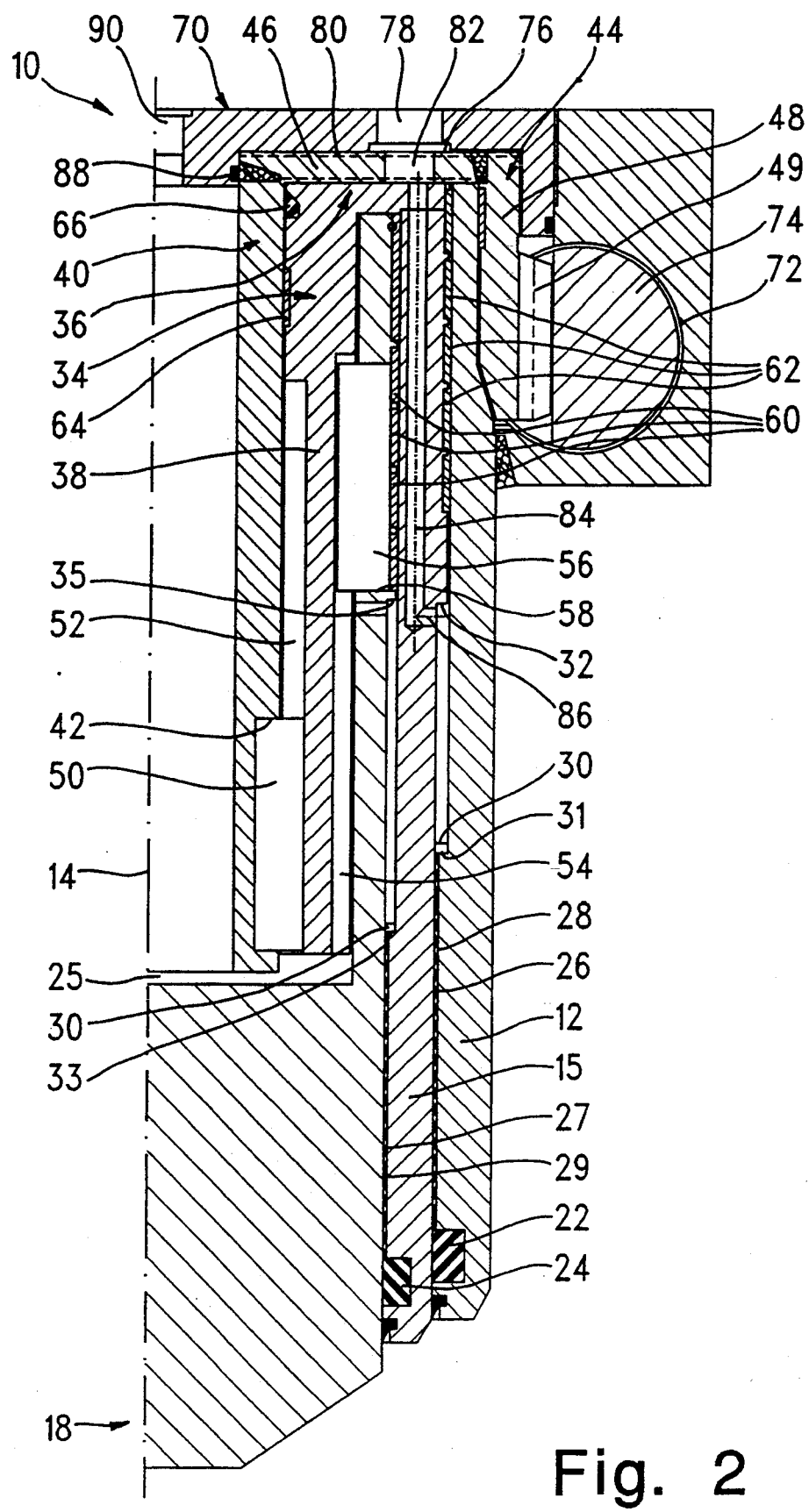
FIG. 2 shows a diagrammatic detail longitudinal section through a steering/lifting appliance with a first and second jacket tube in the theoretical position when the second jacket tube and the piston device are fully retracted.
Figure 3:
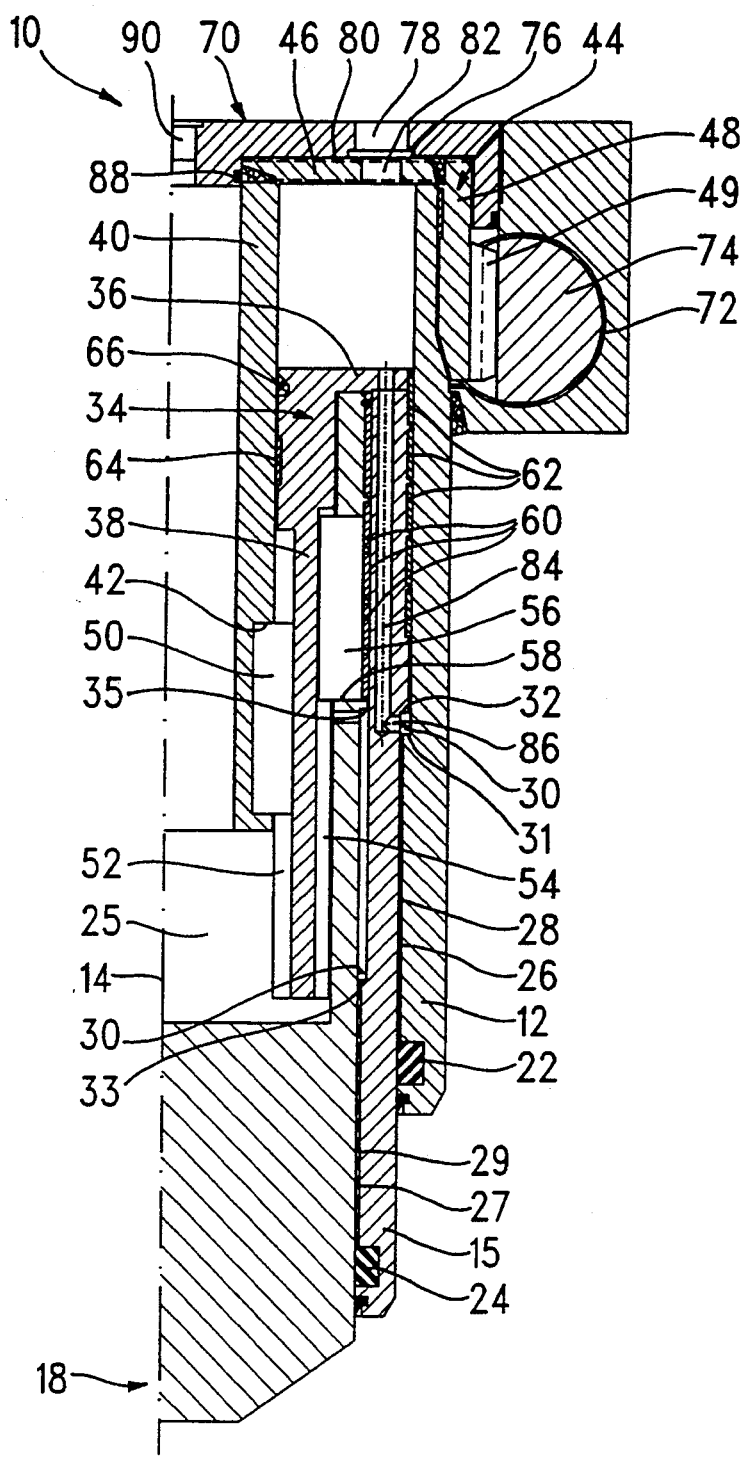
FIG. 3 shows a diagrammatic detail longitudinal section of the steering/lifting appliance in accordance with FIG. 1 in the theoretical position when the second jacket tube is fully extended and FIG. 4 shows a diagrammatic detail longitudinal section of the steering/lifting appliance in accordance with FIG. 2 in the theoretical position when the second jacket tube is fully extended and the piston device is fully extended.
Figure 4:
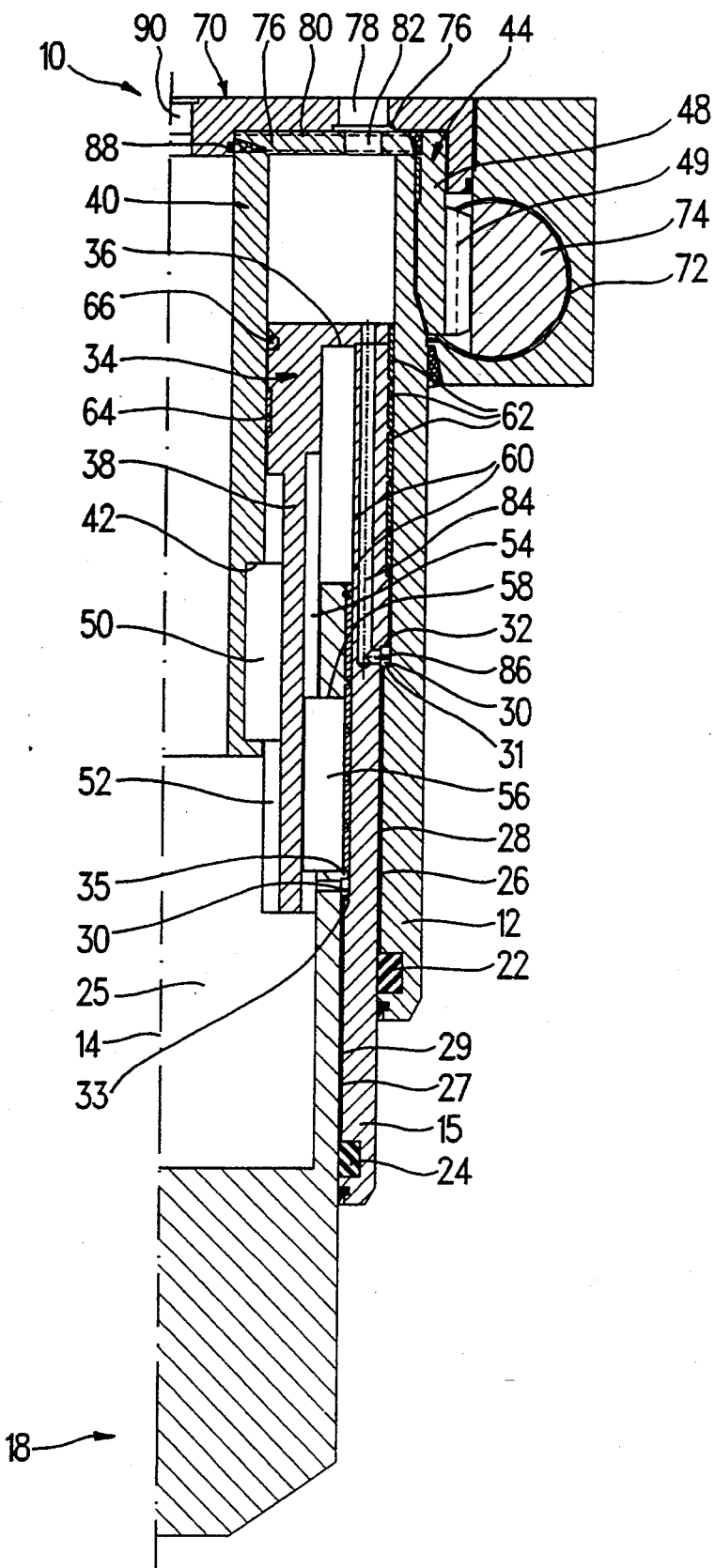

A hydraulic steering/lifting appliance 10 has a first cylindrical jacket tube 12 and a second jacket tube 15 supported in a pressure-tight manner in the first cylindrical jacket tube 12 and arranged in it so as to be longitudinally displaceable and rotatable about a common longitudinal axis 14. A piston device 16, which can be longitudinally displaced and rotated about the longitudinal axis 14, is likewise arranged in the second jacket tube 15. In its free end region protruding beyond the second jacket tube 15, the piston device 16 has a connection device 18 for wheel units 20; the connection device 18 is only shown diagrammatically in the figures and the wheel unit 20 is likewise only shown diagrammatically in FIG. 1.

In its lower end region, the first jacket tube 12 has a sealing ring 22 which ensures a pressure-tight connection between the first jacket tube 12 and the second jacket tube 15 while simultaneously ensuring that the second jacket tube 15 can be longitudinally displaced and rotated. In its lower end region, the second jacket tube 15 likewise has a sealing ring 24 which ensures a pressure-tight closure of the second jacket tube 15 relative to the piston device 16, rotation and longitudinal displaceability of the piston device 16 relative to the second jacket tube 15 being ensured at the same time.

The steering/lifting appliance 10 permits, on the one hand, an up-and-down motion (H) of the piston device 16 to compensate for ground unevenness possibly present when a plurality of steering/lifting appliances are used on a transport appliance and, on the other hand, permits turning (D) of the piston device about the longitudinal axis 14 and, therefore, steering of the wheel unit 20. As shown in FIG. 1, a total of three steering/lifting appliances 10 are combined in one unit. Sequential guide strips 26 and 27 are respectively arranged on the inside of the first jacket tube 12 and the second jacket tube 15 above the respective sealing rings 22 and 24. These guide strips are used to support the second jacket tube 15 in the lower end region of the first jacket tube 12 and to support the piston device 16 in the lower end region of the second jacket tube 15. Longitudinally extending grooves 28 and 29 are arranged in the region of the guide strips 26, 27 and these supply the surfaces between the first jacket tube 12 and the second jacket tube 15, on the one hand, and between the piston device 16 and the second jacket tube 15, on the other, with hydraulic fluid in order to ensure satisfactory sliding of the surfaces on one another.

Above the guide strips 26, 27, the first jacket tube 12 and the second jacket tube 15 each have a cross-sectional step 31 and 33, respectively, a support ring 30 being arranged at the position of these cross-sectional steps 31, 33. These support rings 30 are used as stops for limiting the extension motion of the second jacket tube 15 and the piston device 16 which, for this purpose, each likewise have a cross-sectional step 32 and 35, respectively, which comes into contact with the respective support ring 30 in the fully-extended condition of the piston device 16 and the second jacket tube 15.

In its upper end region, the piston device 16 has a cylindrical recess 25 whose axis coincides with the longitudinal axis 14, i.e. the piston device 16 is configured as a tubular profile in this region.

In its upper end region, the second jacket tube 15 has a second skirt profile 34 which surrounds the wall of the piston device 16. The second skirt profile 34 is formed by a first arm 36 and a second arm 38 which follows on from the first arm 36, the first arm 36 being arranged in a plane at right angles to the longitudinal axis 14 and the second arm 38 being arranged in a cylindrical plane parallel to the longitudinal axis 14. The first arm 36 and the second arm 38 therefore form a cylindrical torus which surrounds the end region of the wall of the piston device 16. In addition to the second arm 38 of the second skirt profile 34, an essentially mushroom-type torsion device 40 is supported, hydraulically displaceable relative to the piston device 16, within the recess 25 of the piston device and this torsion device 40 has a cylindrical main body, which is configured as a hollow profile and has rectangular recesses 42 in its wall which are arranged on the outer periphery and respectively offset by 90°. The axis of the torsion device 40 coincides with the longitudinal axis 14. The recesses 42 extend parallel to the longitudinal axis 14. At the level of the end surface of the first jacket tube 12 and of the upper outer surface of the first arm 36 of the second skirt profile 34, a first skirt profile 44 is connected with externally flush edge to the cylindrical body of the torsion device 40. This skirt profile 44 is configured as a torus which possesses a first arm 46 arranged horizontally, i.e. at right angles to the longitudinal axis, and a second arm 48, which is connected so that it extends at right angles downwards along the outer wall of the first jacket tube 12. The second arm 48 is provided with a toothed ring 49 pointing outwards.

Spring elements 50 configured as flat sheet-metal elements are arranged in the recesses 42 of the torsion device 40 and protrude beyond the outer wall of the torsion device 40. These spring elements 50 respectively engage in longitudinal grooves 52, which are present on the second arm 38 of the second skirt profile 36 of the second cylindrical jacket tube 15 and extend parallel to the longitudinal axis 14, so that longitudinal displaceability is ensured between the torsion device 40 and the second jacket tube 15. On the side opposite to these grooves 52, furthermore, the second arm 38 possesses further grooves 54 which are present in the wall of the second arm 38, likewise parallel to the longitudinal axis 14. Spring elements 56, each likewise configured as flat sheet-metal elements, are guided so that they can be displaced longitudinally in these grooves 54 and are arranged in a rectangular recess 58 of the wall of the piston device 16. The spring elements 56 and the grooves 54 are likewise present in such a way that they are offset in the peripheral direction by 90°.

The upper end region of the outer wall of the piston device 16 is supported on guide strips 60 present on the inside of the second jacket tube 15. The outer wall of the second jacket tube 15 is, in turn, likewise supported on guide strips 62 present on the inner wall of the first jacket tube 12. Finally, there is a guide strip 64 present on the outside on the second arm 38 of the skirt profile 34 in the upper end region and the outer wall of the main body of the torsion device is in contact with this guide strip 64. A sealing ring 66 is arranged on the outside of the second arm 38 of the second skirt profile 34 above this guide strip 64 and this sealing ring 66 is in contact so that it seals with the outer wall of the main body of the torsion device.

The torsion device 40 and its first skirt profile 44 protruding outwards are surrounded at the top by a cap device 70 which is connected so that it seals on the outer wall of the first jacket tube 12 below the second arm 48 of the first skirt profile 44. Viewed from the top, the cap device 70 has an essentially square plan view. A through recess 72 is present on one side in a tangential plane parallel to the first jacket tube and a displaceably supported rack 74, which engages in the toothed ring 49, is hydraulically supported in the recess 72. The configuration of the recess 72 and rack 74, and of their hydraulic control, is known and is comprehensively described in German Utility Model G 92 13 073.9.

On its lower surface, the cap device 70 has an annular recess and the width of the annular recess essentially corresponds to the width of the first arm 46 of the first skirt profile 44 of the torsion device 40. On the inside, the cap device 70 has an annular passage 76 which is accessible from the outside by means of at least one hole 78. A spiral-shaped groove 80 is milled into the upper surface of the first arm 46 of the first skirt profile 44, which forms the support surface between the torsion device 40 and the cap device 70. Hydraulic fluid can be supplied into the spiral-shaped groove 80 via the hole 78 and the annular passage 76.

The first arm 46 of the first skirt profile 44 likewise has a hole 82 connected to the annular passage 76 in the region of the hole 78. This hole 82 fulfils the objective of ensuring the supply of hydraulic fluid into the space between the torsion device 40 and the second jacket tube 15. Groove systems are respectively milled on the lower surface of the first arm 46 of the first skirt profile 44 and on the upper surface of the first arm 36 of the second skirt profile 34. These groove systems cross so that the region between the torsion device and the second jacket tube 15 can be filled with hydraulic fluid without difficulty, even when the surfaces are in contact. In addition, a hole 84 present in the wall of the second jacket tube 15 and parallel to the longitudinal axis 14 is present in the region of the hole 82 and this hole 84 supplies the region between the first jacket tube 12 and the second jacket tube 15 with hydraulic fluid via a connecting hole 86 present at right angles to the hole 84.

In order to form a first hydraulic chamber which is accessible from the outside via the hole 78 and is pressure-tight, there is a sealing ring 88 present on the cap device 70 and this ring is present in the connecting region between the first arm 46 of the first skirt profile 44 and the main body of the torsion device 40. A first closed chamber system is formed by the sealing rings 88, 66 and 22 and this chamber system can have hydraulic fluid admitted to it from the outside via the hole 78 and completely surrounds the first skirt profile 44 of the torsion device 40, the toothed ring 49 and the rack 74 with hydraulic fluid and ensures the presence of hydraulic fluid between the outer wall of the second jacket tube 15 and the inner wall of the first jacket tube 12.

The admission of hydraulic fluid to this first system has the effect that the second jacket tube 15 and the piston device 16 are displaced downwards and that the escape of hydraulic fluid from this first system permits a displacement upwards.

A second chamber system is separated from the first chamber system by the seals 88, 66 and 24. Hydraulic fluid can be admitted from the outside to this second chamber system through a central hole 90 present on the cap device 70 in the longitudinal axis 14. The second chamber system is formed by the internal space of the main body of the torsion device 40, the space present between the torsion device 40 and the recess 25 of the piston device 16, the supply of hydraulic fluid to the region between the outside of the piston device 16, the inside of the second jacket tube 15 and the opposite surfaces of the second arm 38 of the second skirt profile of the second jacket tube 15 and the outer wall of the torsion device 40 being ensured at the same time. Admission of hydraulic fluid to this second chamber system has the effect that the piston device is displaced downwards relative to the second jacket tube 15 and to the first jacket tube 12 and is displaced upwards on the escape of hydraulic fluid.

The mode of operation and the mutual connection of one axle compensation appliance with three steering-/lifting appliances combined in one working group is shown in FIG. 1 in a very diagrammatic fashion. Each steering/lifting appliance 10 has a first chamber system and a second chamber system in accordance with the description presented above. Both chamber systems are accessible from the outside via the openings 78 and 90 and are filled with hydraulic fluid, preferably hydraulic oil. The first chamber system and the second chamber system of each steering/lifting appliance are connected together by means of common connecting conduits 92 and 94. The chamber systems are supplied with oil via filling valves 96 and 98. The oil source additionally present is not shown. The chamber of the first system is diagrammatically represented in FIG. 1 by means of dots and the chamber of the second system is diagrammatically represented by means of circles.

The mode of operation of the hydraulic axle compensation appliance is briefly described below. The oil present in the first chamber systems, which are connected by means of the conduit 92, ensures uniform force transmission, as in the known appliances. The connecting conduits can be closed or opened by means of the filling valves 96, 98. In the operating condition, the filling valves 98 are closed. In operation, the cylinders are filled with operating medium via the connecting conduits of a system 94 or 92 in such a way that both cylinders are located in the central position. The closing element 98 and 96 is then used to shut off and travel (compensation +/−) can begin. The pressure building up in the second chamber system due to the load occurring is distributed between the second chamber systems via the conduit 94. The second chamber system is therefore floating in the system of the first chamber. Different pressures are present in the conduits 92 and 94 corresponding to the effective surfaces fixed by design. If the first chamber system or the second chamber system is loaded at the beginning of use, the axle unit lifts by the lift corresponding to the oil quantity fed in. It is normal to extend to half the lift for travel so that the fluctuations of, for example, the road can extend into the plus and minus. If the second chamber system is loaded at this time to 50% of its stroke for this purpose, the axle system is ready for operation.

If the axle system rolls over a bump, oil is moved back and forward within the chamber systems. The axle compensation adjusts itself without valves. Because the hydraulic resistance increases with the square of the velocity, an even distribution of the compensating motion oscillates between the first and second system. In the case of leakage or the rupture of a hose or a chamber system, the axle system drops back to half the lift height. The working pressure, however, does not increase in the remaining residual system. The residual system continues to function. In every condition of the individual chamber systems, the wheel units 23 can be steered by displacing the rack 74 without difficulty in accordance with the invention. The displacement can take place hydraulically or pneumatically. It is possible to dispense with additional hose units required for steering both the known appliances. Because all the parts necessary for the steering essentially float in hydraulic oil, their wear is practically zero so that almost no maintenance is required in this respect. The steering/lifting appliance according to the invention combines the known hydraulic axle compensation appliance configured as a two-circuit system with the advantages of problem-free wheel unit steering in every lifting or steering condition of the appliance.

I claim:

1. A steering/lifting appliance for a hydraulic or pneumatic axle compensation appliance configured as a two-circuit system, having
   a) a first external jacket tube,
   b) a second jacket tube inserted in a pressure-tight manner in the first jacket tube and supported so as to be longitudinally displaceable,
   c) a piston device present in a pressure-tight manner in the second jacket tube and supported so as to be longitudinally displaceable,
   d) a first closed chamber system for controlling the relative displacement between the second jacket tube and the first jacket tube,
   e) a second closed chamber system for controlling the relative displacement between the piston device and the second jacket tube,
   f) a torsion device supported in an end region of the piston device and longitudinally displaceable relative to the piston device,
      aa) which torsion device is in engagement with a second skirt profile of the second jacket tube, which profile surrounds the wall of the piston device at least regionally, in such a way that turning of the torsion device effects turning of the second jacket tube and
      bb) which has a first skirt profile passing over the first jacket tube at least regionally,
      cc) the second skirt profile of the second jacket tube being in engagement with the wall of the piston device in such a way that turning of the second jacket tube effects turning of the piston device,
   g) at least one drive device which acts at least regionally on the first skirt profile of the torsion device to turn the torsion device and
   h) a cap device which is fastened to the first jacket tube and which at least partially encloses at least one of the torsion device and drive device to form the first chamber system, the piston device having at least a first recess in which a correspondingly shaped first coupling component engages which is connected to the second jacket tube so as to be longitudinally displaceable and which effects the coupling of the turning motion of the second jacket tube and the piston device, and the torsion device has at least one recess in which a correspondingly shaped second coupling component engages which is connected to the second jacket tube so as to be longitudinally displaceable and which effects the coupling of the turning motion of the second jacket tube and the torsion device.

2. The steering/lifting appliance as claimed in claim 1, wherein the coupling components are respectively configured as spring elements which are guided so as to be longitudinally displaceable in grooves configured on the second skirt profile of the second jacket tube.

3. The steering/lifting appliance as claimed in claim 1, wherein four coupling components or spring elements are respectively arranged offset by 90° along a circle at right angles to the longitudinal axis of the piston device.

4. The steering/lifting appliance as claimed in claim 2, wherein the spring element is configured as a cuboidal component.

5. The steering/lifting appliance as claimed in claim 1, wherein the first skirt profile of the torsion device passing over one of the first jacket tube and the second skirt profile of the second jacket tube passing over the wall of the piston device is formed by a torus.

6. The steering/lifting appliance as claimed in claim 5, wherein the torus has an L-shaped cross-section with a first arm and a second arm and the first arm is arranged essentially parallel in a plane at right angles to the longitudinal axis and the second arm of the first skirt profile is arranged essentially in a cylindrical plane outside the first jacket tube and the second arm of the second skirt profile is arranged between the torsion device and the piston device.

7. The steering/lifting appliance as claimed in claim 6, wherein the second arm of the first skirt profile has a toothed ring device in which at least one drive device having a rack engages.

8. The steering/lifting appliance as claimed in claim 7, wherein the drive rack is supported in the cap device to form the first chamber system in association with the torsion device, the second jacket tube and the first jacket tube.

9. The steering/lifting appliance as claimed in claim 1, wherein the piston device is configured as a tubular cross-section in the end region having the torsion device which is longitudinally displaceable.

10. The steering/lifting appliance as claimed in claim 6, wherein the first arm of the first skirt profile of the torsion device is arranged externally flush with an outer surface of the torsion appliance, an outside support surface arranged at right angles to the longitudinal axis being formed by this means and the support surface facing towards the inside of the cap device having a spiral-shaped groove.

11. The steering/lifting appliance as claimed in claim 1, wherein the drive of the drive device is configured to steer the steering/lifting appliance as a hydraulic, pneumatic or mechanical drive.

12. The steering/lifting appliance as claimed in claim 7, wherein one closed hydraulic or pneumatic chamber is present at two end regions of the rack, the medium of which chamber being respectively present at the end surface of the rack and a control system being present which controls the displacement motion of the rack by means of the chamber.

13. The steering/lifting appliance as claimed in claim 1, wherein the torsion device is configured in an end region of the piston device as a solid profile with a hole as the inlet and outlet for the second chamber.

14. The steering/lifting appliance as claimed in claim 1, wherein the torsion device is configured as a hollow profile in an end region of the piston device.

15. The steering/lifting appliance as claimed in claim 1, wherein the coupling components are configured as involutes.

16. A steering/lifting appliance for a hydraulic or pneumatic axle compensation appliance configured as a two-circuit system, having
  a) a first external jacket tube,
  b) a second jacket tube inserted in a pressure-tight manner in the first jacket tube and supported so as to be longitudinally displaceable,,
  c) a piston device present in a pressure-tight manner in the second jacket tube and supported so as to be longitudinally displaceable,
  d) a first closed chamber system for controlling the relative displacement between the second jacket tube and the first jacket tube,
  e) a second closed chamber system for controlling the relative displacement between the piston device and the second jacket tube,
  f) a torsion device supported in an end region of the piston device and longitudinally displaceable relative to the piston device,
    aa) which torsion device is in engagement with a second skirt profile of the second jacket tube, which profile surrounds the wall of the piston device at least regionally, in such a way that turning of the torsion device effects turning of the second jacket tube and
    bb) which has a first skirt profile passing over the first jacket tube at least regionally,
    cc) the second skirt profile of the second jacket tube being in engagement with the wall of the piston device in such a way that turning of the second jacket tube effects turning of the piston device,
  g) at least one drive device which acts at least regionally on the first skirt profile of the torsion device to turn the torsion device and
  h) a cap device which is fastened to the first jacket tube and which at least partially encloses at least one of the torsion device and drive device to form the first chamber system, the second skirt profile of the second jacket tube having at least a first recess in which a correspondingly shaped first coupling component engages which is connected to the piston device so as to be longitudinally displaceable and which effects the coupling of the turning motion of the second jacket tube and the piston device, and the second skirt profile of the second jacket tube has at least one second recess in which a correspondingly shaped second coupling component engages which is connected to the torsion device so as to be longitudinally displaceable and which effects the coupling of the turning motion of the second jacket tube and the torsion device.

* * * * *